(12) United States Patent
Hoofard et al.

(10) Patent No.: US 6,931,686 B2
(45) Date of Patent: Aug. 23, 2005

(54) SUPPORT LEG SYSTEM AND METHOD FOR SUPPORTING A DOCK LEVELER

(75) Inventors: Richard K. Hoofard, Dallas, TX (US); James C. Alexander, Coppell, TX (US); Douglas H. Massey, New Berlin, WI (US)

(73) Assignee: SPX Dock Products Inc., Sussex, WI (US)

( * ) Notice: Subject to any disclaimer, the term of this patent is extended or adjusted under 35 U.S.C. 154(b) by 0 days.

(21) Appl. No.: 10/385,751

(22) Filed: Mar. 12, 2003

(65) Prior Publication Data

US 2004/0177456 A1 Sep. 16, 2004

(51) Int. Cl.$^7$ .................................................. E01D 1/00
(52) U.S. Cl. ......................................... 14/69.5; 14/71.1
(58) Field of Search ............................. 14/69.5, 71.1, 14/71.3

(56) References Cited

U.S. PATENT DOCUMENTS

| | | | |
|---|---|---|---|
| 3,117,332 A | * 1/1964 | Kelley et al. ................ 14/71.3 |
| 3,137,017 A | * 6/1964 | Pfleger et al. ............... 14/71.3 |
| 3,728,753 A | 4/1973 | Beckwith et al. |
| 3,835,497 A | 9/1974 | Smith |
| 3,858,264 A | 1/1975 | Kuhns et al. |
| 3,877,102 A | 4/1975 | Artzberger |
| 3,887,102 A | 6/1975 | Artzberger ..................... 14/71 |
| 3,902,213 A | 9/1975 | Pfleger et al. |
| 3,921,241 A | * 11/1975 | Smith .......................... 14/71.7 |
| 3,995,342 A | 12/1976 | Wiener |
| 4,047,258 A | * 9/1977 | Burnham ..................... 14/71.3 |
| 4,279,050 A | 7/1981 | Abbott |
| 4,328,602 A | 5/1982 | Bennett |
| 4,455,703 A | 6/1984 | Fromme et al. |
| 4,531,248 A | 7/1985 | Swessel et al. |
| 4,560,315 A | 12/1985 | Hahn et al. ................. 414/401 |
| 4,570,277 A | 2/1986 | Hahn et al. .................. 14/71.3 |
| 4,605,353 A | 8/1986 | Hahn et al. ................. 414/401 |
| 4,619,008 A | 10/1986 | Kovach et al. |
| 4,634,334 A | 1/1987 | Hahn et al. ................. 414/401 |
| 4,692,755 A | 9/1987 | Hahn et al. ................. 340/687 |
| 4,744,121 A | 5/1988 | Swessel et al. .............. 14/71.7 |
| 4,819,770 A | 4/1989 | Hahn ......................... 188/284 |
| 4,843,373 A | 6/1989 | Trickle et al. .............. 340/540 |
| 4,847,935 A | 7/1989 | Alexander et al. |
| 4,865,507 A | 9/1989 | Trickle ....................... 414/401 |
| 4,920,598 A | 5/1990 | Hahn .......................... 14/71.1 |
| 4,974,276 A | 12/1990 | Alexander |
| 4,995,130 A | 2/1991 | Hahn et al. .................. 14/71.3 |
| 5,040,258 A | 8/1991 | Hahn et al. .................. 14/71.3 |
| 5,111,546 A | 5/1992 | Hahn et al. .................. 14/71.3 |
| 5,123,135 A | 6/1992 | Cook et al. |
| 5,212,846 A | 5/1993 | Hahn et al. .................. 14/69.5 |
| 5,271,183 A | 12/1993 | Hahn et al. ................... 49/360 |
| 5,311,628 A | 5/1994 | Springer et al. ............. 14/71.1 |
| 5,323,503 A | 6/1994 | Springer ..................... 14/71.3 |
| 5,375,965 A | 12/1994 | Springer et al. ............ 414/786 |

(Continued)

OTHER PUBLICATIONS

U.S. Appl. No. 10/324,012, filed Dec. 20, 2002, Massey.
U.S. Appl. NO. 10/401,948, filed Mar. 31, 2003, Webster.
Rite–Hite, AL–800 Powered Dock Leveler Owner's Manual, Jan. 2003, pp. 2–37.

Primary Examiner—Robert E. Pezzuto
Assistant Examiner—Raymond W Addie
(74) Attorney, Agent, or Firm—Baker & Hostetler LLP

(57) ABSTRACT

A dock leveler includes a support leg system configured to remain in a support position when the dock leveler descends rapidly and retract when the dock leveler descends slowly. A disengaging system is also included to disengage the support legs from retracting when the dock level lip is in a pendant position. A method of operating a dock leveler includes keeping a support leg in a support position when a dock leveler descends rapidly and retracting a support leg when the dock leveler descends slowly.

22 Claims, 11 Drawing Sheets

U.S. PATENT DOCUMENTS

| | | |
|---|---|---|
| 5,440,772 A | 8/1995 | Springer et al. |
| 5,442,825 A | 8/1995 | Hahn et al. .................. 14/71.1 |
| 5,453,735 A | 9/1995 | Hahn ........................ 340/687 |
| 5,531,557 A | 7/1996 | Springer ..................... 414/401 |
| 5,546,623 A | 8/1996 | Hahn .......................... 14/69.5 |
| 5,551,113 A | 9/1996 | Marler et al. |
| 5,553,343 A | 9/1996 | Alexander |
| 5,553,987 A | 9/1996 | Ellis ........................... 414/401 |
| 5,560,063 A | 10/1996 | Alten et al. |
| 5,582,498 A | 12/1996 | Springer et al. ............ 414/401 |
| 5,640,733 A | 6/1997 | Alten et al. |
| 5,657,502 A * | 8/1997 | Ellis ........................... 14/71.1 |
| 5,664,930 A | 9/1997 | Ellis ........................... 414/401 |
| 5,702,223 A | 12/1997 | Hahn et al. ................. 414/401 |
| 5,713,072 A | 1/1998 | Marth et al. ............... 455/33.1 |
| 5,762,459 A | 6/1998 | Springer et al. ............ 414/401 |
| 5,813,072 A | 9/1998 | Alexander |
| 5,832,554 A | 11/1998 | Alexander |
| 5,882,167 A | 3/1999 | Hahn et al. ................. 414/401 |
| 5,964,572 A | 10/1999 | Hahn et al. ................. 414/800 |
| 6,010,297 A | 1/2000 | Hahn et al. ................. 414/401 |
| 6,035,475 A | 3/2000 | Alexander |
| 6,061,859 A | 5/2000 | Winter |
| 6,065,172 A | 5/2000 | Swessel ..................... 14/71.7 |
| 6,070,283 A | 6/2000 | Hahn ........................ 14/71.1 |
| 6,074,157 A | 6/2000 | Hahn ........................ 414/401 |
| 6,085,375 A | 7/2000 | Holm |
| 6,092,970 A | 7/2000 | Hahn ........................ 414/401 |
| 6,106,212 A | 8/2000 | Hahn ........................ 414/401 |
| 6,116,839 A | 9/2000 | Bender et al. .............. 414/401 |
| 6,190,109 B1 | 2/2001 | Bender ....................... 414/401 |
| 6,216,303 B1 | 4/2001 | Massey |
| 6,220,809 B1 | 4/2001 | Hahn ........................ 414/401 |
| 6,238,163 B1 | 5/2001 | Springer et al. ............ 414/401 |
| 6,276,016 B1 | 8/2001 | Springer |
| 6,311,352 B1 | 11/2001 | Springer |
| 6,322,310 B1 | 11/2001 | Bender et al. .............. 414/401 |
| 6,327,733 B1 | 12/2001 | Alexander et al. |
| 6,360,394 B1 | 3/2002 | Hahn ........................ 14/71.1 |
| 6,368,043 B1 | 4/2002 | Leum ........................ 414/401 |
| 6,431,819 B1 | 8/2002 | Hahn ........................ 414/809 |
| 6,440,772 B1 | 8/2002 | Smith |
| 6,460,212 B2 | 10/2002 | Massey et al. |
| 6,473,926 B2 | 11/2002 | Lounsbury |
| 6,487,741 B2 * | 12/2002 | Alexander .................. 14/71.3 |
| 6,627,016 B2 | 9/2003 | Abare et al. ................ 156/64 |
| 2002/0092102 A1 | 7/2002 | Lounsbury |

* cited by examiner

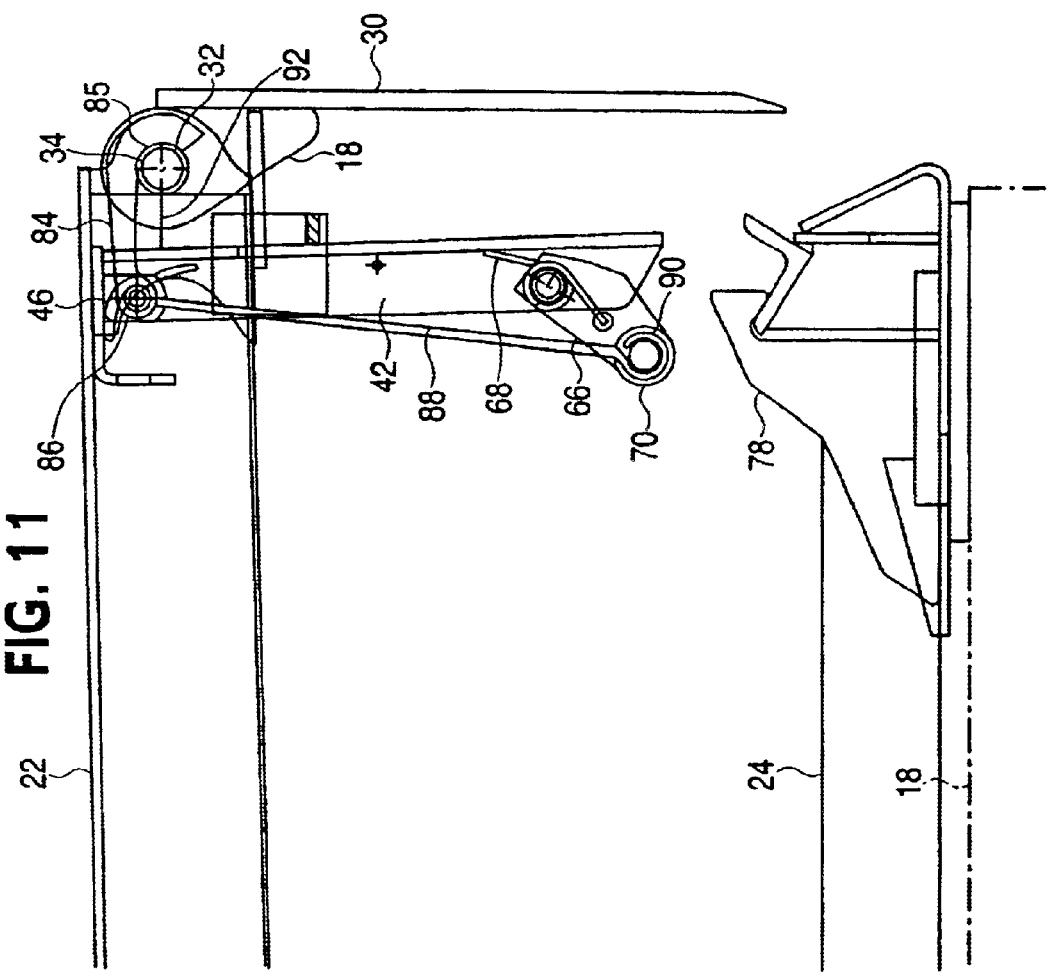

SUPPORT LEG SYSTEM AND METHOD FOR SUPPORTING A DOCK LEVELER

FIELD OF THE INVENTION

The present invention relates generally to dock levelers. More particularly, the present invention relates to a method and apparatus for providing support legs for a dock lever configured to reduce the effects of stump-out and freefall.

BACKGROUND OF THE INVENTION

Dock levelers are mounted in loading docks and are used to bridge a gap between a loading dock and the end of a vehicle parked at the loading dock. For example, trucks or tractor trailers may be loaded and unloaded at loading docks with the help of a dock leveler. The dock leveler enables material handling equipment such as a fork lift to move between the dock and the vehicle bed. Because not all vehicle beds are of the same height, many dock levelers are configured to pivot up and down in order to adjust and create a bridge between the loading dock and the vehicle bed. Typical dock levelers include a ramp portion. In addition, dock levelers may include a lip mounted at the end of the ramp. When a vehicle backs up to the dock, often the lip is extended and rests directly on the bed of the vehicle. Some dock levelers use the bed of the vehicle as a support for the lip and the ramp so that vehicle, such as fork lifts, material, and operators move between the vehicle bed and the dock.

If a vehicle, whose bed is supporting the dock leveler, were to pull away from the dock, the dock leveler may become unsupported and move rapidly down to a low position under the influence of gravity and strike the support structure in the pit of the dock leveler. This condition is known in the industry as free fall. Free fall can have unpleasant consequences particularly when dock workers or material handling vehicles such as fork lifts are on the dock leveler during a time when free fall occurs. In order to mitigate the effects of free fall, many dock levelers are equipped with various devices in order to limit or negate the effects of free fall.

One such device used to limit the effects of free fall is a support structure known as a support leg. A dock leveler may have one or more support legs. Often a dock leveler has a pair of support legs. Many support legs are configured so that they support the dock leveler at dock level, (a position where the ramp is level with the surrounding loading dock). When vehicles back up to a loading dock with the bed of the vehicle located at dock level or above, the dock leveler may be raised, the lip extended, and the dock leveler lowered until the lip rests on the bed of the vehicle. If the vehicle has a bed located above dock level, the support legs may be slightly above a corresponding support structure configured to support the support legs. Thus, if free fall occurs, the support legs will only permit the dock leveler to fall a limited amount before the support legs engage their support structure.

One problem associated with support legs is that if a vehicle with a bed located below dock level backs up to the dock, the support legs must be retracted to allow the ramp to lower until the lip rests on the bed of the vehicle. If the support legs are not retracted, the deck will be supported at dock level and the lip will fall to rest on the bed of the vehicle. Thus the angle of the lip relative to the vehicle bed will be steeper than normal. This condition of the support legs preventing the deck from being lowered is known in the industry as stump-out.

Stump-out can also occur as a vehicle is loaded. For example, the support legs may initially be above their support structure when the vehicle first backs up to a dock leveler. But as the vehicle is loaded and becomes heavier, the vehicle suspension may deflect due to the increasing load. As the vehicle bed becomes lower and lower the support legs may engage the support structure thus causing stump-out.

Stump-out can also occur when the support legs are still slightly above the corresponding support structure. As a fork truck moves in and out of the vehicle, deflection of the vehicle suspension will cause the vehicle and the dock leveler to move up and down several inches and cause the support legs to impact the corresponding support structure.

Stump-out can cause a variety of problems. For example, the steep angle of lip may inhibit material handling equipment such as fork lift, from exiting the vehicle. The steep ramp may also cause the counterweight of a fork lift to impact the lip causing damage to the dock leveler, and potential injury to the fork lift driver. When stump-out is caused by deflection of the vehicle suspension, the repeated pounding of the support legs on the corresponding support structure can cause structural damage to the dock leveler and to the concrete pit that supports the dock leveler.

In order to avoid stump-out many dock levelers include retractable support legs that maintain the ramp in a substantially horizontal position when the ramp is not in use (i.e., when the dock leveler is not engaged with the truck bed). These legs can be retracted for servicing truck beds that are below dock level. Typically a pair of support legs are pivotally attached to the ramp near the lip hinge and extend downwardly to engage a supporting sub frame. These support legs may be spring biased forward toward a supporting position and may be retracted to a non-supporting position by one of several means.

Both manual and automatic mechanisms have been used to retract support legs. Manual support leg retraction mechanisms may require an operator to engage a mechanism, for example, by pulling a chain to retract the support legs as the ramp is being lowered. Automatic support leg retraction mechanisms typically retract the support legs as the lip of the dock leveler is extended. In this way the support leg is retracted when the lip engages a truck. However, retracting the support legs with manual mechanisms may require additional labor when trying to mate the dock lever to the truck, and retracting the support legs with automatic mechanisms may add complexity to the dock leveler.

Accordingly, a dock leveler that is able to deal with the problems of free fall and stump-out while at the same time reducing the amount of labor and complexity of a dock leveler is desired.

SUMMARY OF THE INVENTION

The foregoing needs are met, to a great extent, by the present invention, wherein in one aspect an apparatus is provided that in some embodiments includes a dock leveler that is able to deal with the problems of free fall and stump-out while at the same time reducing the amount of labor and complexity of a dock leveler.

In accordance with one embodiment of the present invention, a dock leveler is provided. The dock leveler includes a ramp configured to move between a raised and lowered position, a support leg configured to move between a support position supporting the ramp and a retracted position the support leg biased to the support position, and a support leg moving assembly configured to move the support leg to the retracted position when the ramp moves to the lowered position slower than a predetermined rate and not move the support leg to the retracted position, when the ramp is moving toward the lowered position faster than a predetermined rate.

In accordance with another embodiment of the present invention, a dock leveler is provided. The dock leveler includes a ramp configured to move between a raised and lowered position, means for supporting the ramp configured to move between a support position supporting the ramp and a retracted position, the supporting means biased to the support position, and means for moving the supporting means configured to move the supporting means to the retracted position when the ramp moves to the lowered position slower than a predetermined rate and not move the supporting means to the retracted position when the ramp is moving toward the lowered position faster than a predetermined rate.

In accordance with yet another embodiment of the present invention, a method of operating a dock leveler is provided. The method includes biasing a support leg to a ramp supporting position, moving the support leg to a retracted position when the ramp descends slower than a predetermined speed, and maintaining the support leg in the supporting position when the ramp descends faster than a predetermined speed.

In accordance with yet another embodiment of the present invention, a method of operating a dock leveler is provided. The method includes biasing a support leg to a ramp supporting position, moving the support leg to a retracted position when the ramp descends slower than a predetermined speed and a lip associated with the dock leveler is in an extended position maintaining the support leg in the supporting position when the ramp descends faster than a predetermined speed.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 11 is a side view of a dock leveler where the lip is in a pendant position preventing the roller cam from engaging the camming surface.

DETAILED DESCRIPTION

Figure 1:
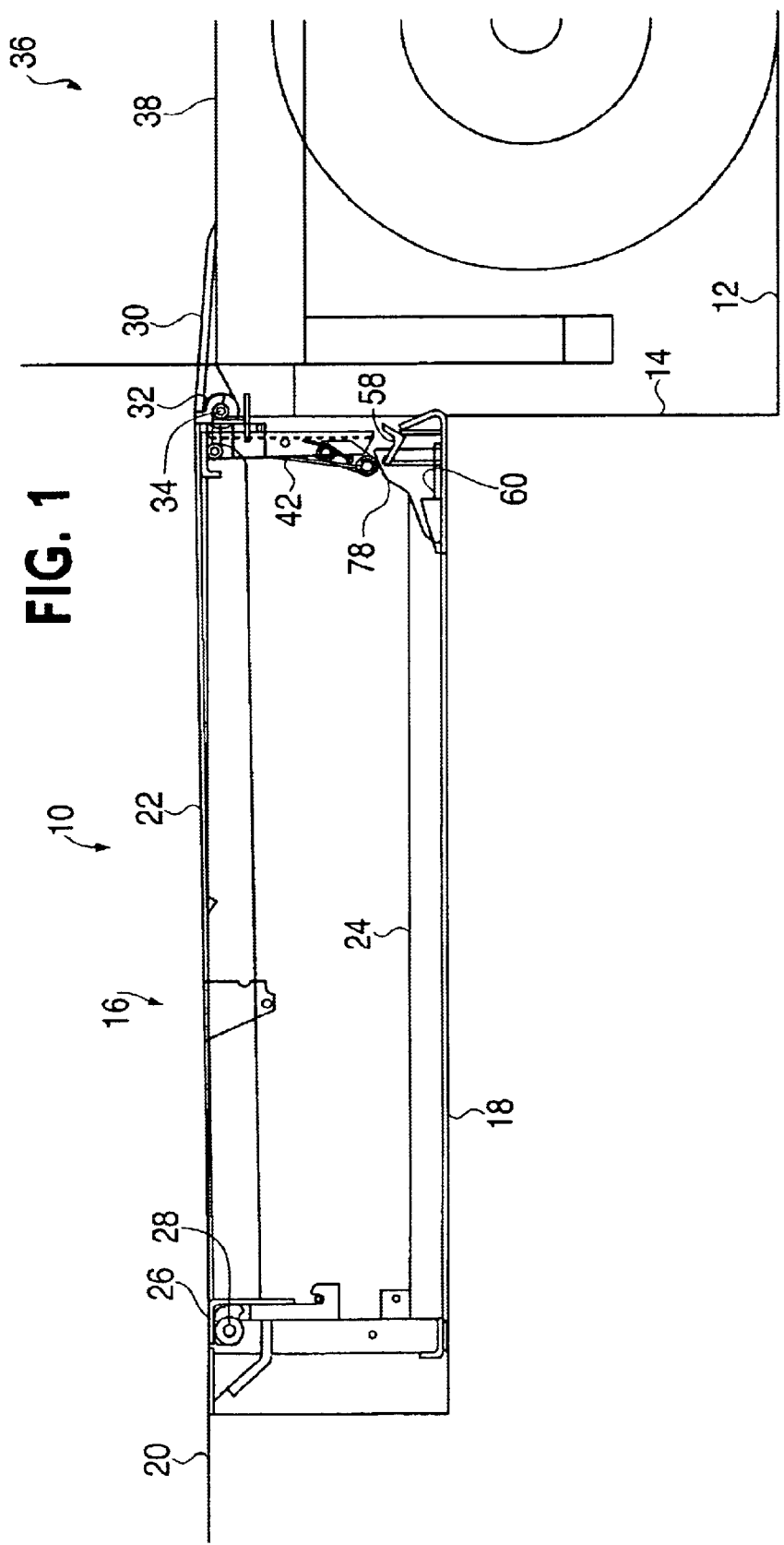
FIG. 1 is a side view illustrating a dock leveler according to a preferred embodiment of the invention.

The invention will now be described with reference to the drawing figures in which like reference numerals refer to like parts throughout. An embodiment in accordance with the present invention provides a dock leveler having support legs configured to support the ramp when the support legs are in a supporting position. The support legs are configured to retract allowing the ramp to move to a below dock level position. The support legs, when attached to a support leg moving assembly, are configured to move the support legs to a retracted position when the ramp moves to a lowered position at a relatively slow rate. For the purpose of this document, the lowered position of the dock leveler ramp is when the ramp is moved to the lowest position it can achieve. The support leg moving assembly is configured to not move the support legs to the retracted position when the ramp is moving to a lowered position at a relatively fast rate for example, when the ramp is in free fall.

The support legs move to a retracted position when the dock leveler ramp is being slowly moved to a below dock level position, yet if the ramp is in a free fall condition the support legs are left in the support position and thus minimizing the amount of free fall a ramp experiences. Permitting the support legs to maintain a supporting position when the ramp is in free fall can minimize the effect of free fall, yet allowing the support legs to be retracted when the ramp needs to achieve a below dock position can reduce the occurrence of stump-out.

Referring now to FIG. 1 a side view of a loading dock 10 is shown. In front of the loading dock 10 is a driveway 12 extending to a dock face 14. The dock leveler 16 is located in a recess in the dock 20 called a pit 18. The pit 18 is positioned below the surface 20 of the loading dock 10. A dock leveler 16 includes a deck or ramp portion 22. The deck or ramp 22 is attached to a frame portion 24 of the dock leveler 16 by a hinge 26 and one or more pins 28. At the other end of the ramp 22, a lip 30 is attached to the ramp 22 by a hinge 32 and one or more hinge pins 34. It is the lip 30 that engages a vehicle 36 and completes a bridge between the loading dock 10 and the bed 38 of a vehicle 36. The bridge permits material and material handling equipment such as fork lifts to go between the bed 38 of the vehicle 36 and the loading dock 10. The dock leveler 16 also includes support leg system 40 shown in FIG. 2.

Figure 2:
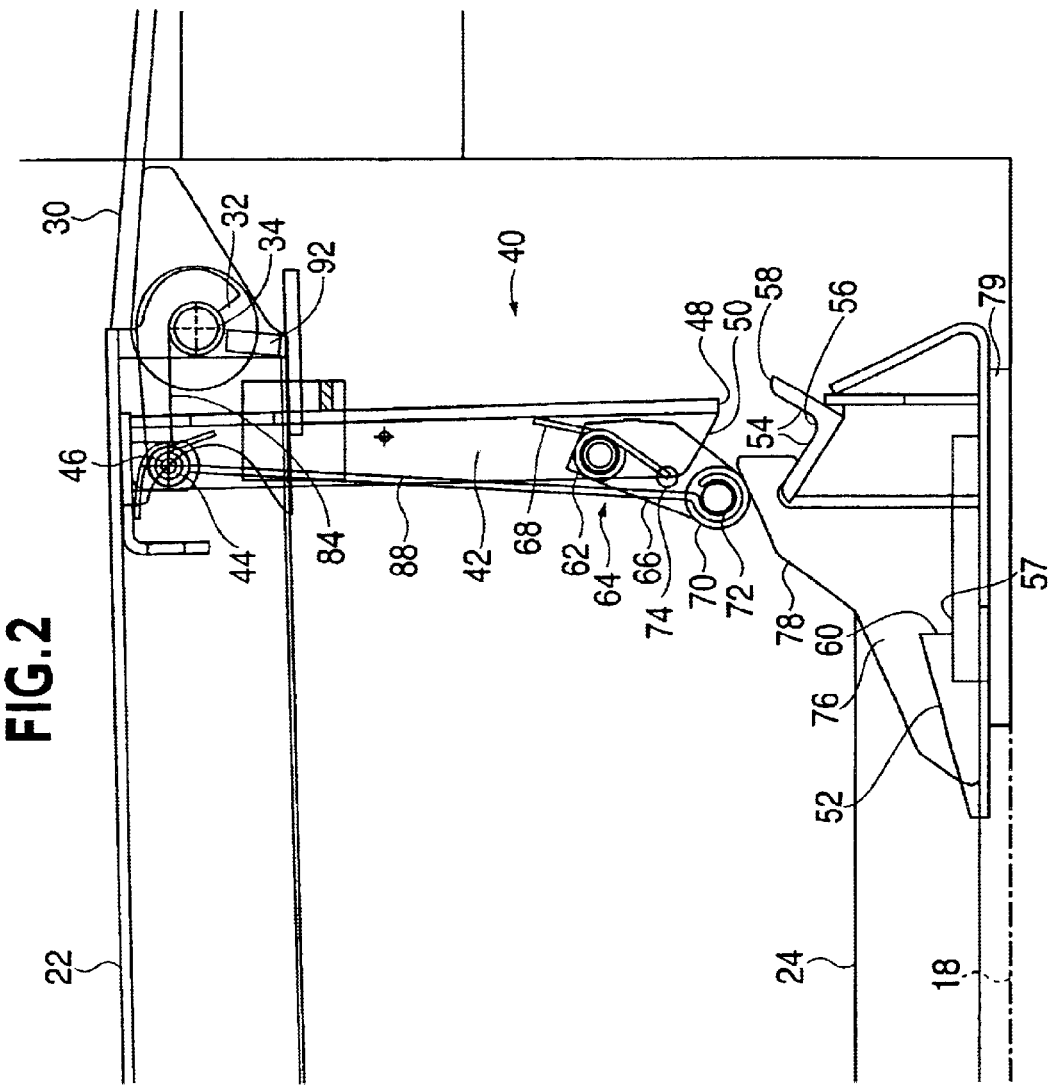
FIG. 2 is a side view of a support leg system for a dock leveler.
Figure 4:
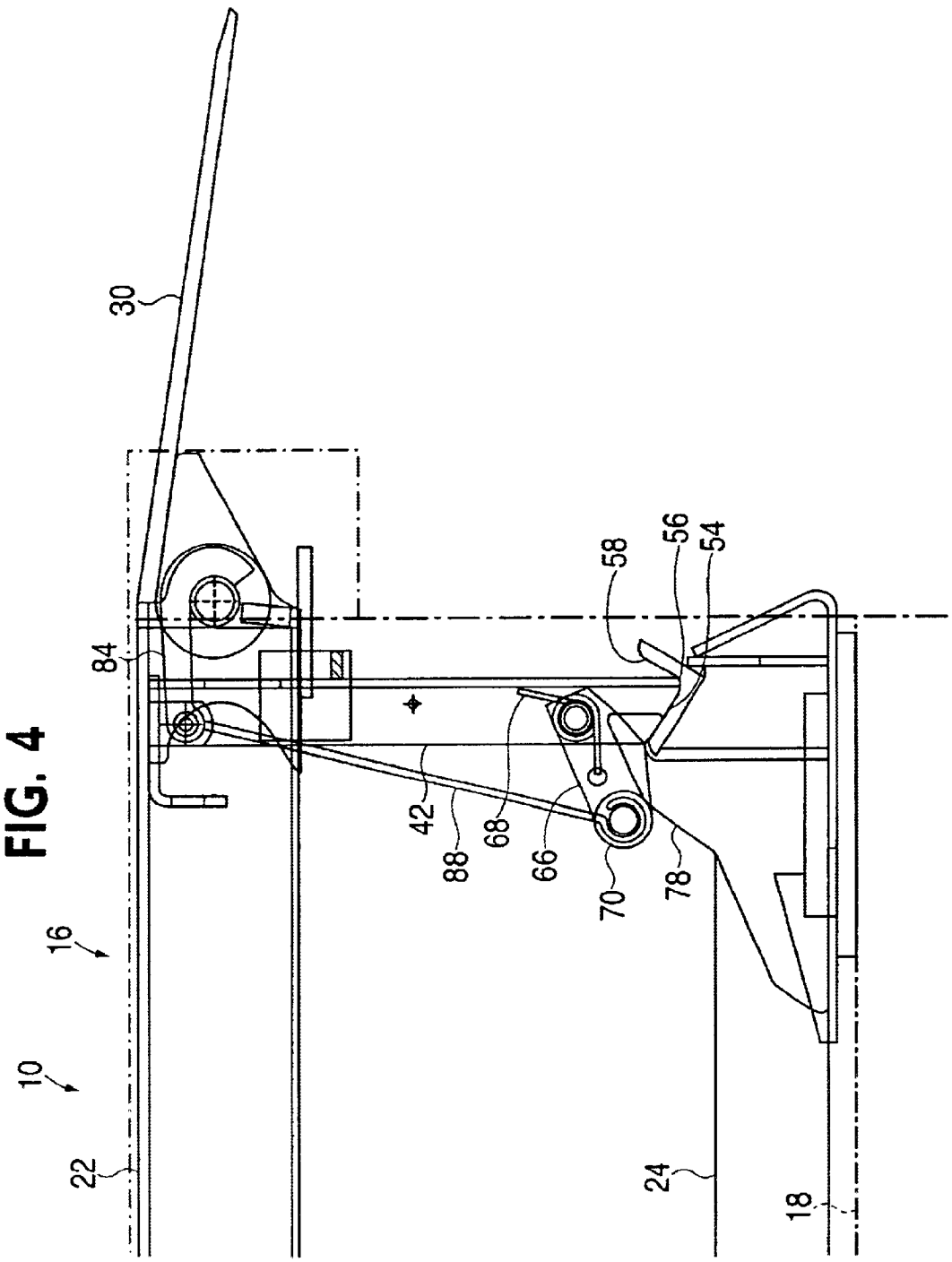
FIG. 4 is a side view of a dock leveler which has rapidly fallen and the support leg is supporting the ramp of the dock leveler.
Figure 6:
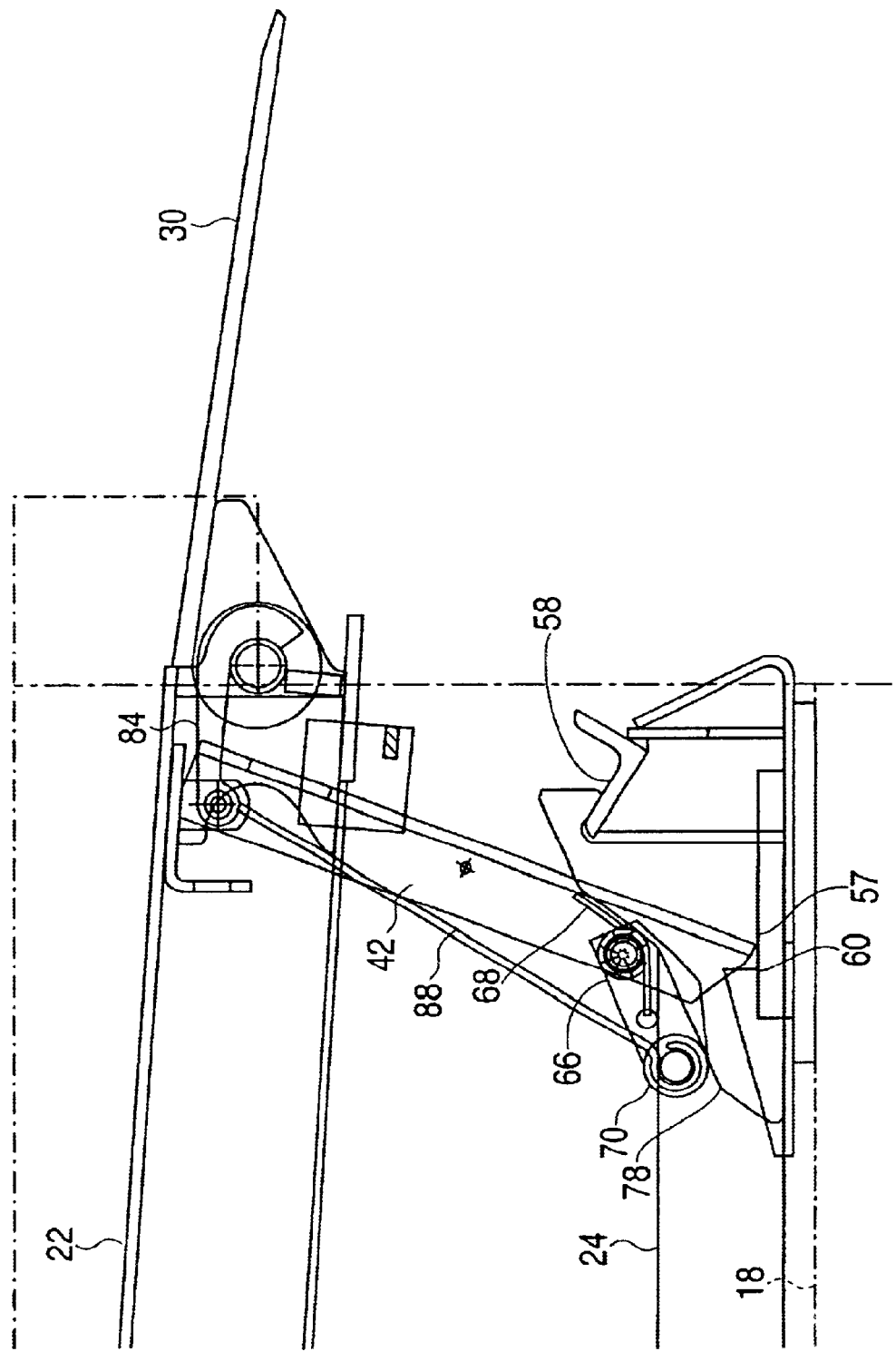
FIG. 6 is a side view of a dock leveler that has experienced a rapid fall after the support leg has started to retract and the support leg is in a secondary support position.

In the embodiment illustrated in FIG. 2 the support leg 42 is carried by a hinge assembly 44 attached underneath the deck 22. Some embodiments of the invention include two support legs 42 located parallel to each other at either side of the ramp. A spring 46 biases the leg 42 toward a support position. The support leg 42 has multiple support surfaces 48 and 50. The support surfaces interface with surfaces 52, 54, 56, 57 of support blocks 58 or 60. FIG. 4 shows the support leg 42 interfacing with the support surface 54 and 56 of support block 58. FIG. 6 shows the support leg 42 interfacing with the support surface 57 of support block 60.

Returning to FIG. 2, the support leg 42 has a pin 62 extending laterally that supports the cam roller assembly 64. The cam roller assembly 64 is comprised of a cam arm 66, a biasing spring 68 and a roller cam 70. The roller cam 70 is attached to the cam arm 66 by a shaft 72. The cam arm 66 includes a hole 74 that acts as a place for the spring 68 to attach to on the cam arm 66. Attached to the dock leveler frame 24 is a support block 58 which includes a saddle portion 54 and 56 configured to support and/or align the support leg 42. A secondary support block 60 is also provided to support or align the support leg 42 when the support leg 42 has been partially retracted and no longer able to engage the first stop block 58. A plate 76 defining a camming surface 78 is also attached to the frame portion 24 of the dock leveler 16. The frame portion 24 of the dock leveler 16 is supported by a shim 79 that extends to provide support to the frame portion 24 supporting stop blocks 58 and 60.

The function of the cam roller assembly 64 is to move the support leg 42 to the retracted position when the ramp 22 is descending at a relatively slow speed. In other words when the dock leveler 16 is not in a free fall condition.

As the ramp 22 descends, the roller cam 70 engages the camming surface 78. As the ramp 22 continues to descend, the roller cam 70 continues to move along the camming surface 78. If the ramp 22 is moving downward at a relatively slow speed, then the spring 68 is able to urge the support leg 42 to rotate in a clockwise direction, or in other words, to a retracted position. However, if the ramp 22 is moving quickly in a downward direction, for example, in a free fall condition, then the roller cam 70 will move quickly down the cam surface 78. The spring 68 will not be able to quickly overcome the inertia associated with the support leg 42 and rotate the support leg 42 to the retracted position. Instead, the spring 68 will deflect, thus leaving the support leg 42 in a supporting position. Therefore, when the ramp 22 descends at a relatively slow rate of speed, the support leg 42 will retract. However, if the ramp 22 descends at a high rate of speed such as a free fall condition, the support leg 42 will remain in a supporting position.

The predetermined speed at which the support leg 42 will retract or stay in the support position will depend on the spring 68 and the weight and/or inertia associated with the support leg 42 and other variables associated with a particular installation. One skilled in the art will be able to make appropriate design choices to achieve the desired results of the invention. The spring 68 and support leg 42 and other factors specific to the installation should be considered and selected so that the support leg 42 stays in a support position when the ramp 22 is in free fall.

Figure 3:
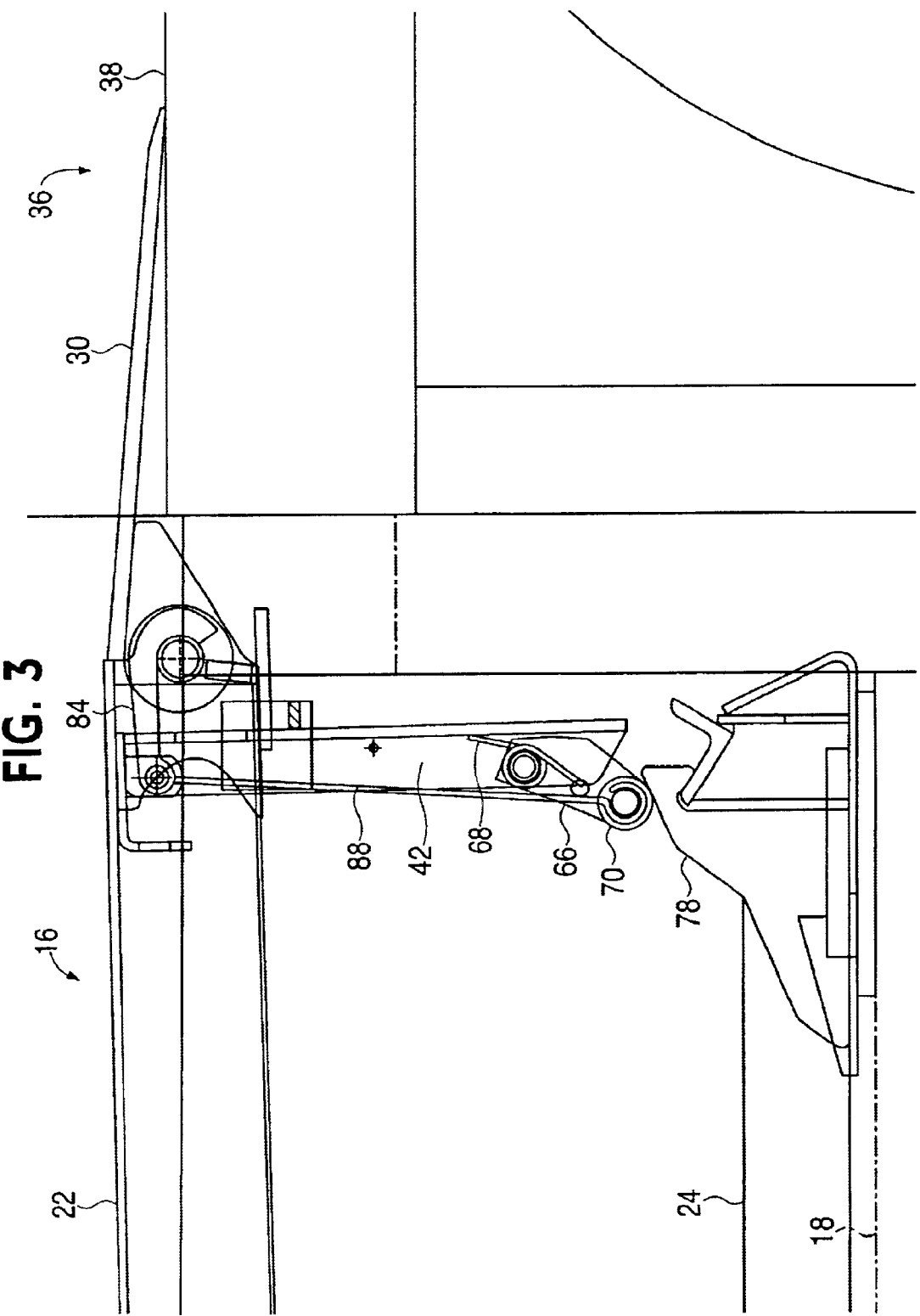
FIG. 3 is a side view of a dock leveler with a lip engaged with a vehicle bed and a roller cam engaging a camming surface.

FIG. 3 illustrates the dock leveler 16 engaging a vehicle 36.

FIG. 4 illustrates the support leg 42 in the support position when the ramp 22 has descended quickly. The spring 68 is deflected as the roller cam 70 is quickly moved on the camming surface 78 because the spring 68 is not able to quickly overcome the inertia of the support leg 42 and rotate it to a retracted position.

According to some embodiments of the present invention, the support leg 42 may be used to support the ramp 22 at the dock level position (i.e., when the ramp 22 is level with the surrounding loading dock 10). For example, in FIG. 4 the support leg 42 is engaging the first stop block 58 and the ramp 22 is at the dock level position. Storing the dock leveler 16 with a ramp 22 in the dock level position is a preferred mode of storage because it eliminates any tripping hazard created by a ramp 22 above or below dock level.

Figure 5:
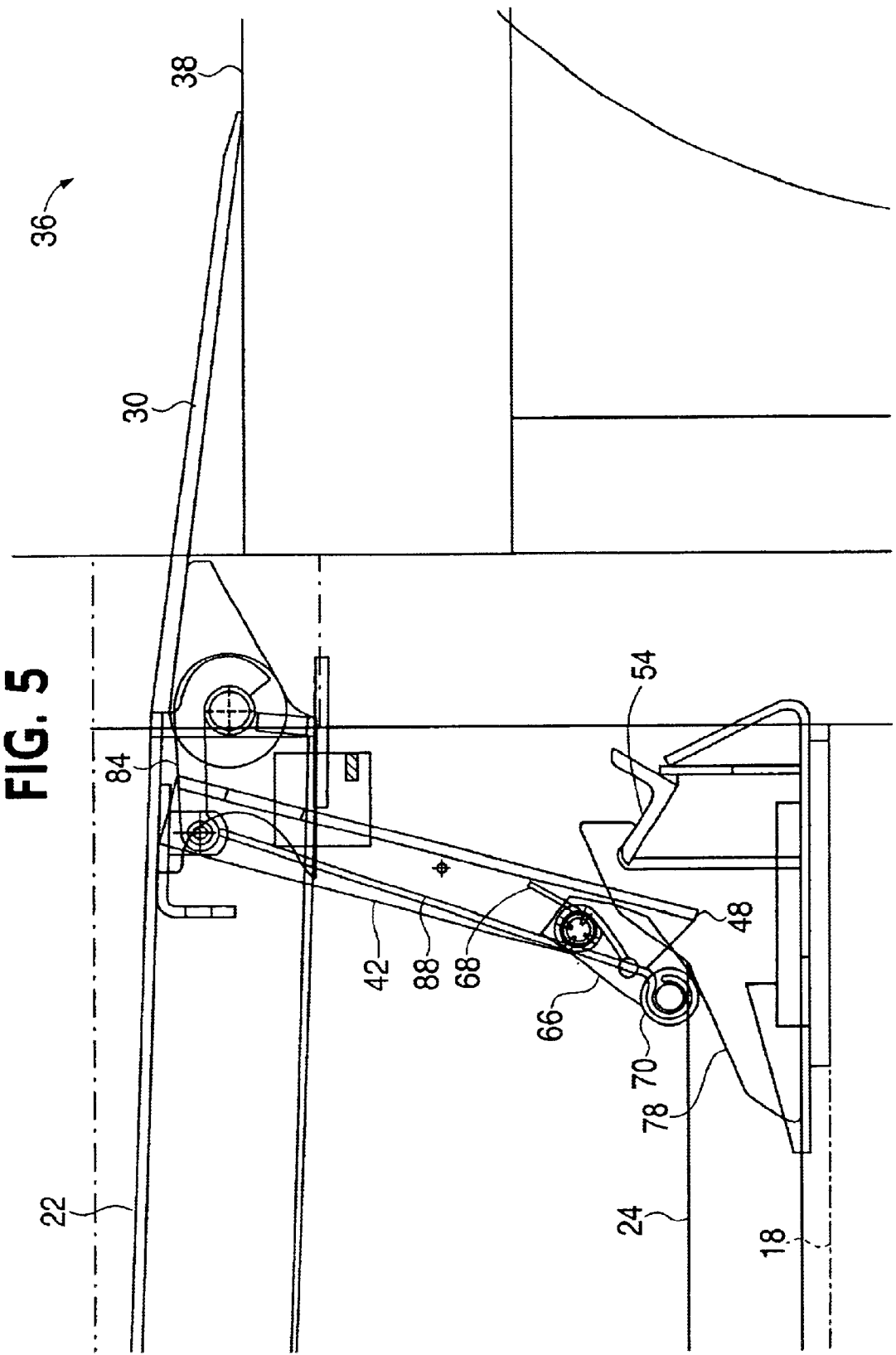
FIG. 5 is a side view of a dock leveler with the lip of the dock leveler engaged with a low vehicle bed and the support leg is in partially a retracted position.

FIG. 5 illustrates a condition where the ramp 22 starts to descend slowly and the roller cam 70 moves down the camming surface 78 and the spring 68 urges the support leg 42 to retract. Support surface 48 has moved to a position where further rapid decent if the ramp 22 can not be supported by support surface 54.

If, after the support leg 42 starts to retract due to a slow downward movement of the ramp 22, the ramp 22 then suddenly descends rapidly then the spring 68 will be deflected as the roller cam 70 is quickly moved on the camming surface 78 because the spring 68 is not able to quickly overcome the inertia of the support leg 42 and rotate it to a retracted position and thus, the support leg 42 engages in an intermediate support position as the spring 68 deflects. The intermediate support position is shown in FIG. 6. In FIG. 6 the support leg 42 has been retracted enough to not contact the first stop block 58 but instead contacts the second stop block 60.

Figure 7:
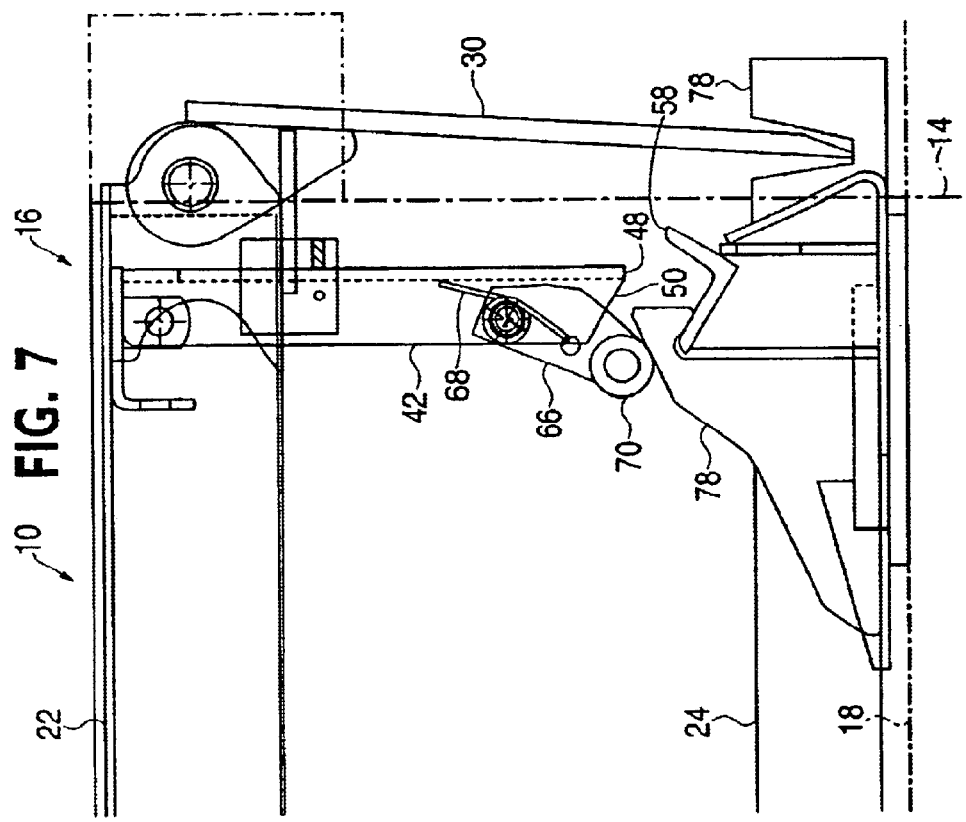
FIG. 7 is a side view of a dock leveler where the ramp is supported in the dock level position by a lip keeper.

In other embodiments of the present invention as shown in FIG. 7, the ramp 22 is supported in the level position by the lip 30 engaging a lip keeper 78. The lip keeper 78 may be attached to the frame 24 of the dock leveler 16 or to some other portion of the dock 10 or dock leveler 16 near the dock face 14. When the lip keeper 78 supports the ramp 22 in the level position, the support leg 42 may be dimensioned so that the support leg 42 does not contact the stop block 58 when the ramp 22 is in a level position.

Other embodiments of the present invention may include the support leg 42 attached to some other structure other than the ramp 22. For example, in FIG. 8 the support leg 42 is attached to a structure 80 which in turn is attached to the pit 18. The structure 80 may be attached to the pit 18 via a shim 79.

Figure 9:
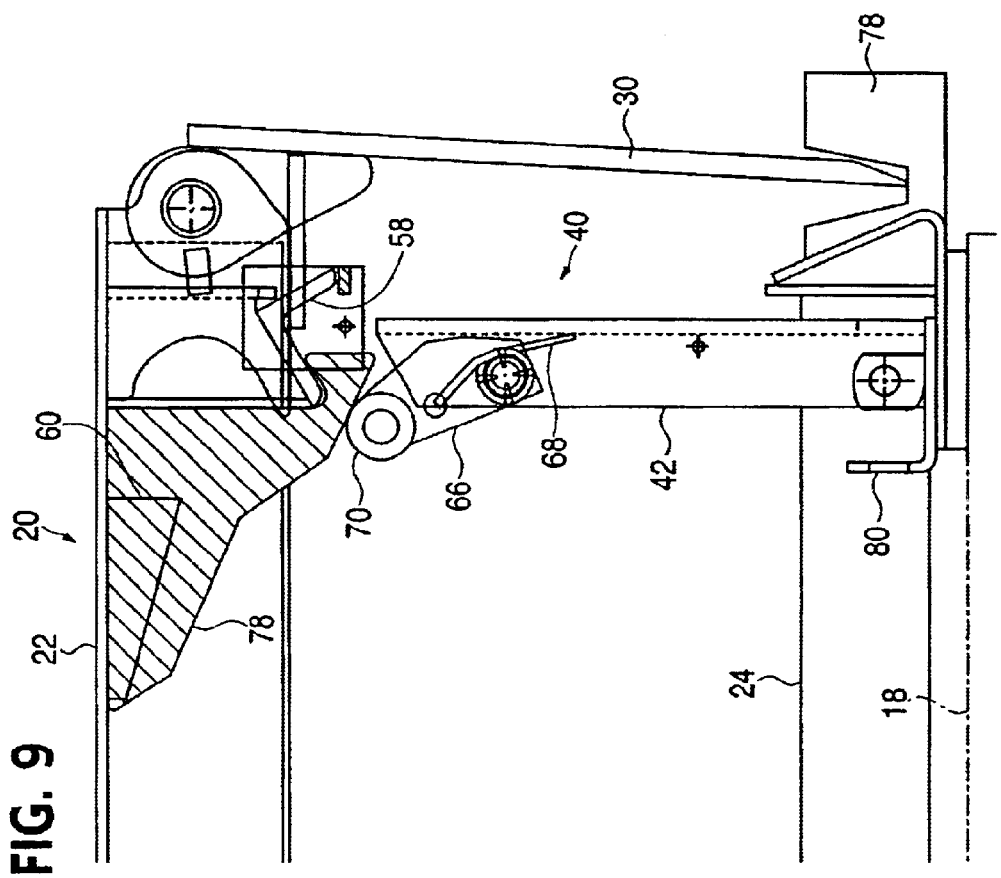
FIG. 9 is an embodiment of the present invention where the support leg is mounted in a pit portion of the dock and the ramp is supported by a lip engaging the lip keeper.

As shown in FIG. 9, other embodiments of the present invention may include attaching the support leg 42 to a frame portion 24 of the dock leveler 16. The stop 58 is attached to the under portion of the ramp 22. The camming surface 78 may also be attached to the underside of the ramp 22. The support leg 42 may be dimensioned to not contact the stop 58 when the ramp 22 is in a dock level position but rather a lip keeper 78 and the lip 30 may support the ramp 22 at the dock level position.

The support leg system 40 described herein generally provides for the support leg 42 to be a in support position when the ramp 22 descends rapidly, and the support leg 42 to be retracted when the ramp 22 descends slowly. There may be an occasion when it is desired to permit the support leg 42 to remain in the support position when the ramp 22 descends slowly. For example, when a dock leveler 16 no longer needs to be used, and stored with the ramp 22 in the level position, and the support leg 42, rather than a lip keeper 78 is used to support the ramp 22 in the level position, it may be desired to slowly move the ramp 22 from a raised position when engaging the vehicle 36 to a stowed or level position. Thus, a disengaging system 82 is provided to disengage the roller cam 70 from the camming surface 78, preventing the support leg 42 from retracting as the ramp 22 descends slowly.

Figure 10:
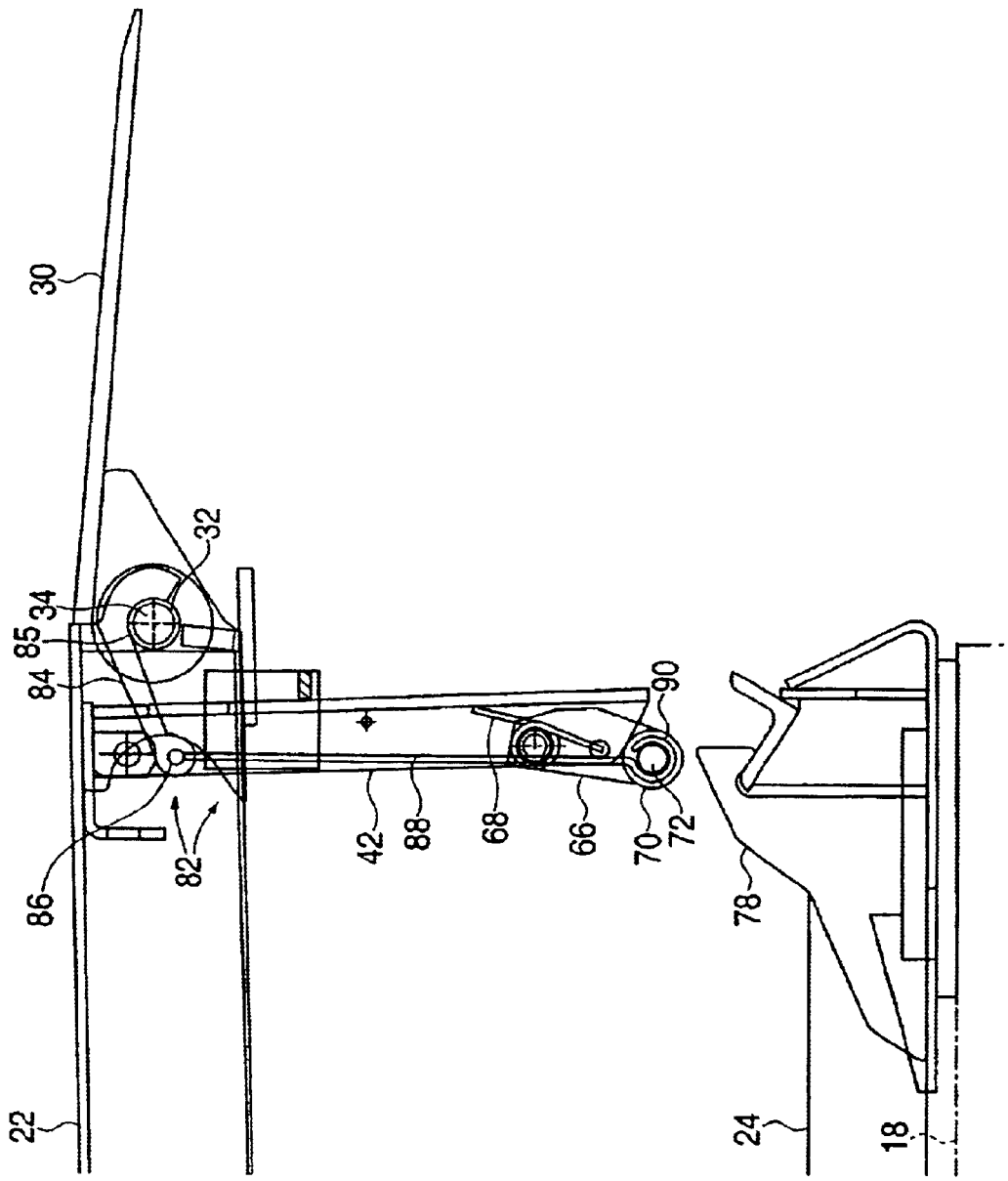
FIG. 10 is a side view of a dock leveler where the ramp is in a slightly inclined position such that the roller cam does not engage the camming surface.

As shown in FIG. 10 a disengaging mechanism 82 may be provided on the dock leveler 16 to disengage the support leg 42 retracting apparatus. The disengaging mechanism 82 shown in FIG. 10 includes an arm 84 connected to the lip hinge 32. The arm 84 is configured to pivot around the lip hinge pin 34. The lip hinge pin 34 may be encased in a tube 85, and the arm 84 will pivot around the tube 85. At the end of the arm 84 is a hole 86 which provides for a rod 88 to attach to the arm 84. The rod 88 also has a loop shaped end 90 which attaches around the shaft 72 of the roller cam 70. When the arm 84 pivots, it acts on the rod 88 which in turn acts on the shaft 72 to flex the spring 68 and move the roller cam 70 away from the camming surface 78.

FIG. 11 shows the arm 84 pivoted and causing the roller cam 70 to be disengaged from the camming surface 78. A striker 92 located on the hinge 32 of the lip 30 contacts the arm 84 and causes the arm 84 to pivot when the lip 30 rotates to a pendant position as shown in FIG. 11. The striker 92 rotates clockwise and engages the arm 84 which in turn acts on the rod 88 pulling the roller cam 70 away from the camming surface 78, thus permitting the support leg 42 to maintain the support position and support the dock leveler ramp 22 when the lip 30 is in a pendant position.

Figure 8:
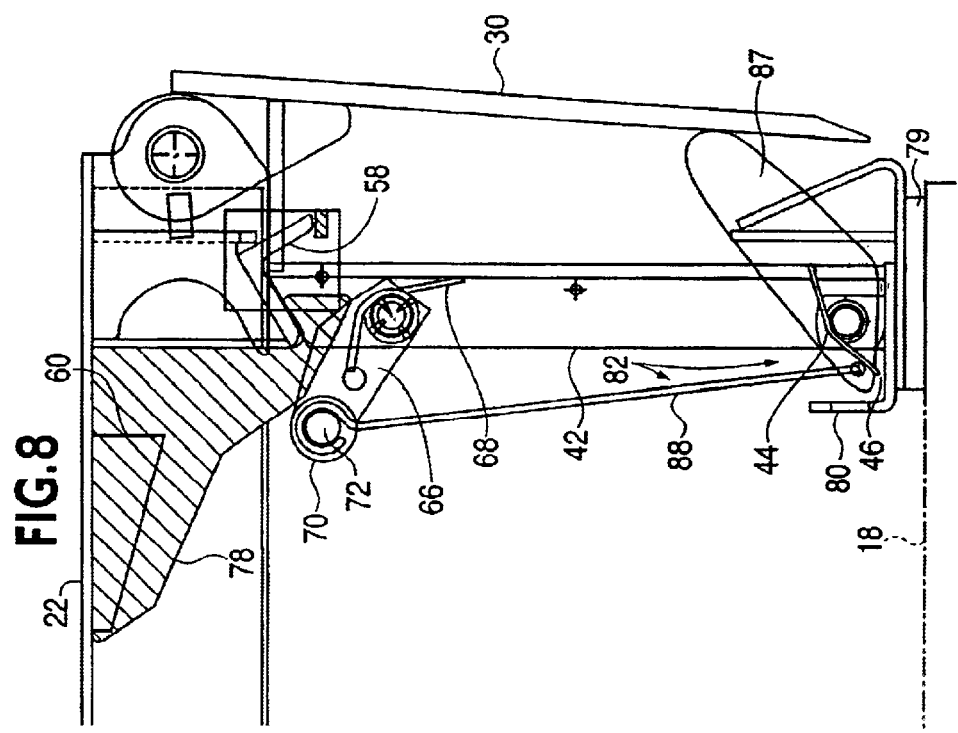
FIG. 8 is an embodiment of the invention where the support leg is mounted in the pit portion of the dock rather than to the ramp.

An alternate embodiment of the disengaging mechanism 82 is shown in FIG. 8. The disengaging mechanism 82 shown in FIG. 8 causes the support leg 42 to remain in the support position when the lip 30 is in a pendant position. The disengaging mechanism shown in FIG. 8 includes an arm 87 and a rod 88 attached around the shaft 72 of the roller cam 70. The disengaging mechanism 82 operates in a similar manner as described above, except that rather than a striker engaging the arm 84 to pivot the cam arm 66, the lip 30 directly contacts the arm 87 to pivot the cam arm 66 when the lip 30 is in a pendant position.

In the embodiments shown in FIGS. 8 and 11, the springs 46 and 68 are selected, and the arms 84 and 87 the rod 88 and the shaft 72 of the roller cam 70 are positioned, so that when the lip 30 is in a pendant position, the rod 88 pulls on the shaft 72 of the roller cam 70 and exerts a moment about the pivot point of the cam arm 66 strong enough to flex spring 68. A moment may also be exerted about the pivot point of the support leg 42 but it is not sufficient to flex spring 46. Thus, the spring 68 will deflect rather than spring 46, which will result in the support leg 42 not retracting. Although embodiments shown in the figures described herein use a roller cam 70 and camming surface 78 to retract the support leg 42 when the ramp 22 is descending in a slow manner, it would be appreciated by one skilled in the art that other items can be used.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler having a ramp configured to move between a raised and one or more lowered positions, comprising:

a support leg means for supporting the ramp, the support leg means configured to move between a support position, through intermediate positions, to a retracted position;

means for biasing the support leg means to the support position; and, means for urging the support leg means to move from the support position to the retracted position when the ramp moves slower than a predetermined rate toward the one or more lowered positions, and for maintaining the support leg means in the support position or an intermediate position when the ramp moves at or greater than the predetermined rate toward the one or more lowered positions, wherein the means for urging comprises a cam arm, a cam, a spring, and a cam engaging surface, wherein the cam arm has a first end and a second end and is connected to the cam at the first end and the spring at the second end, the cam has a retracted and non-retracted position and the spring and support leg means act cooperatively to bias the cam arm toward its non-retracted position, and the cam engaging surface urges the cam arm to move into the retracted position when the ramp moves toward the one or more lowered positions at or greater than the predetermined rate and provides a pathway for the cam to move along when the ramp moves toward the one or more lowered positions slower than the predetermined rate.

2. The dock leveler of claim 1, further comprising:

means for disengaging the means for urging configured to prevent the support leg means from moving to the retracted position when the ramp moves slower than the predetermined rate.

3. The dock leveler of claim 1, further comprising a lip pivotally connected to the ramp and configured to move between an extended position and an inoperative pendant position, and a lip keeper wherein the dock leveler has a stored position and the lip keeper is configured to engage the lip when the dock leveler is in the stored position.

4. The dock leveler of claim 1, wherein the support leg means is dimensioned to support the ramp when the ramp is in an at dock level position.

5. The dock leveler of claim 1, further comprising at least one leg which does not retract when the dock moves toward the one or more lowered positions slower than the predetermined rate.

6. The dock leveler of claim 1, wherein the supporting means is dimensioned to not support the ramp when the ramp is in an at dock level position.

7. The dock leveler of claim 1, further comprising a support structure configured to engage support leg means and to support the ramp when the support leg means engages the support structure.

8. The dock leveler of claim 7, wherein the support structure comprises a first surface and a second surface, wherein the first surface is configured to engage the support leg means when it is in the support position to support the ramp in a first position, and the second surface is configured to engage the support leg means to support the ramp in a second position.

9. The dock leveler of claim 7, wherein the support leg means is adapted to be attached to the ramp, and the support structure is adapted to be attached to a frame portion of the dock leveler.

10. The dock leveler of claim 7, wherein the support leg means is adapted to be attached to a frame portion of the dock leveler, and the support structure is adapted to be attached to the ramp.

11. The dock leveler of claim 7, wherein the support leg means is adapted to be attached to a pit containing the dock leveler, and the support structure is adapted to be attached to the ramp.

12. The dock leveler of claim 7, wherein the support leg means is adapted to be attached to the ramp, and the support structure is adapted to be attached to a pit containing the dock leveler.

13. The dock leveler of claim 3, further comprising:
   a disengaging mechanism configured to prevent the support leg means from moving to the retracted position when the lip is in the pendant position.

14. The support leg system of claim 13, wherein the disengaging mechanism comprises:
   a disengaging arm pivotally mounted around a lip pivot;
   a disengaging rod attached to the disengaging arm at one end and connected to a cam at an other end; and
   an engaging surface coupled to the lip configured, such that when the lip is in the pendant position, the engaging surface can cause the disengaging arm to move, causing the disengaging rod to disengage the cam from a cam surface.

15. The dock leveler of claim 1, further comprising a support block means having at least a first surface and a second surface, wherein the first surface is configured to engage the support leg means and thereby support the ramp in a first position and the second surface is configured to engage the support leg means and thereby support the ramp at a second position.

16. The dock leveler of claim 1, wherein one of the one or more lowered positions is below dock level.

17. The dock leveler of claim 1, wherein one of the one or more lowered positions is at dock level.

18. The dock leveler of claim 1, wherein one of the one or more lowered positions is above dock level.

19. The dock leveler of claim 1, wherein the one or more lowered positions is a first lowered position and a second lowered position, wherein the support leg means is configured to move between the support position and the refracted position through a secondary support position; and, further wherein the support leg means maintains the support position when the ramp initially falls at or greater than a predetermined rate toward the first lowered position, retracts toward the retracted position when the ramp falls slower than the predetermined rate, and maintains the at least one secondary support position when the ramp falls at or greater than a predetermined rate toward the second lowered position.

20. A dock leveler according to claim 1, wherein at least one of the intermediate positions is a secondary support position.

21. A dock leveler according to claim 20, wherein the one or more lowered positions is a dock level position and a below dock level position, and the support leg supports the ramp at the dock level position when the support leg is in the support position and the ramp has moved at or greater than the predetermined rate, and the support leg supports the ramp at the below dock level position when the support leg is in the secondary support position and the ramp has moved at or greater than the predetermined rate.

22. A method of alleviating free-fall of a dock-leveler ramp when a truck suddenly disengages from a dock-leveler ramp, comprising providing a dock leveler having a support leg system for supporting the ramp and a cam assembly for moving the support leg between a support position and a retracted position,
   wherein the support leg is biased to the support position and moves to the retracted position when the ramp moves slower than a predetermined rate toward a lowered position, and
   wherein the cam assembly comprises a cam arm having a first and second end, a cam connected to the first end of the cam arm, a spring operatively connected to the second end of the cam arm and the support leg to bias the cam arm to a non-retracted position, and a cam engaging surface which urges the cam arm to move into the retracted position when the ramp moves toward the lowered position at or greater than the predetermined rate and provides a pathway for the cam to move along when the ramp moves toward the lowered position slower than the predetermined rate.

* * * * *

UNITED STATES PATENT AND TRADEMARK OFFICE
CERTIFICATE OF CORRECTION

PATENT NO.   : 6,931,686 B2
DATED        : August 23, 2005
INVENTOR(S)  : Richard K. Hoofard et al.

It is certified that error appears in the above-identified patent and that said Letters Patent is hereby corrected as shown below:

Column 10,
Line 2, please replace "refracted" with -- retracted --.

Signed and Sealed this

Eleventh Day of October, 2005

JON W. DUDAS
*Director of the United States Patent and Trademark Office*